M. M. McLEAN.
VEHICLE TIRE.
APPLICATION FILED MAY 7, 1917.
1,264,537.
Patented Apr. 30, 1918.
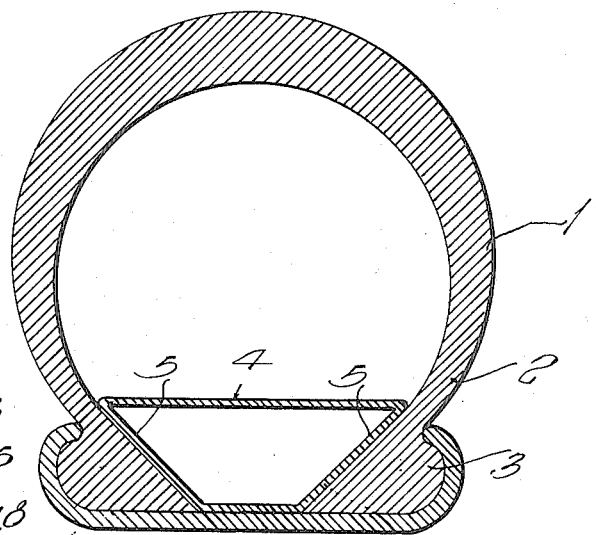
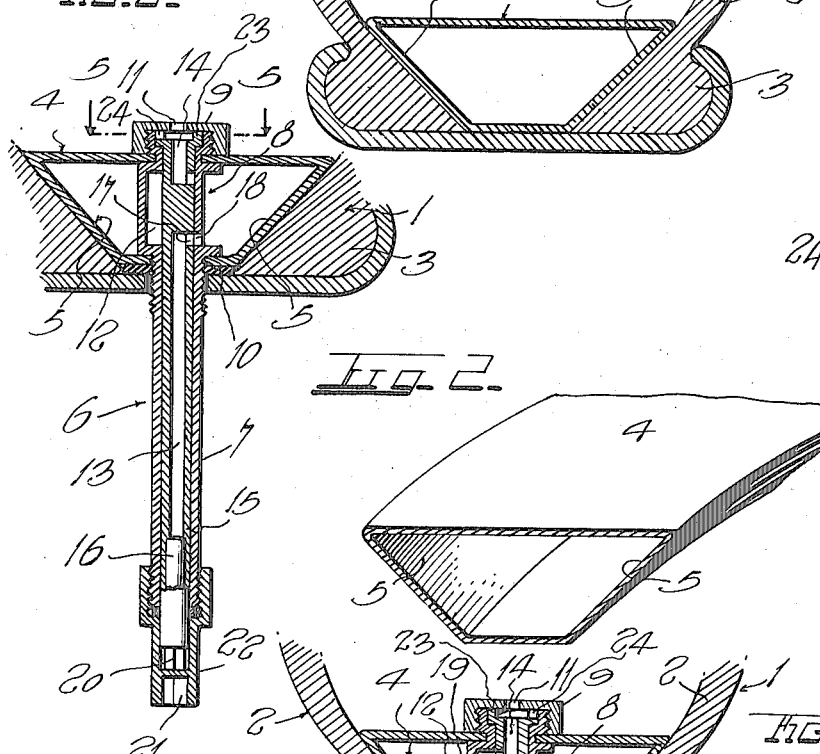
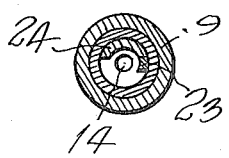
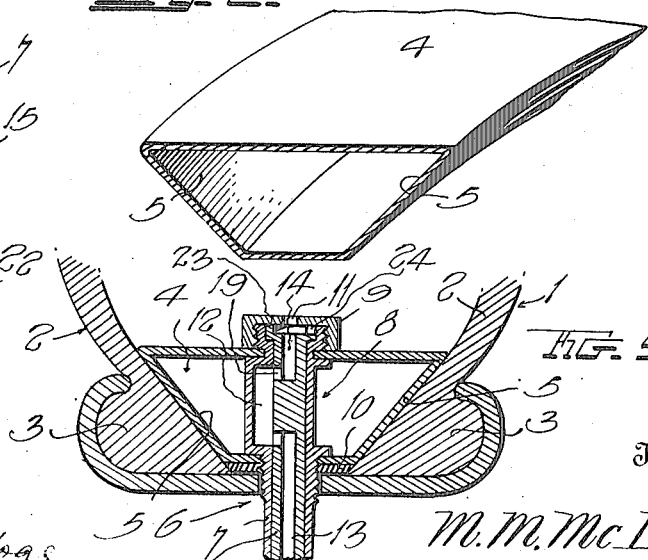
Witness
J. Ralph Hoge
Inventor
M. M. McLean
By
Attorneys

UNITED STATES PATENT OFFICE.

MALCOLM M. McLEAN, OF SALT LAKE CITY, UTAH, ASSIGNOR TO GEORGE M. McLEAN.

VEHICLE-TIRE.

1,264,537.

Specification of Letters Patent.  Patented Apr. 30, 1918.

Application filed May 7, 1917. Serial No. 166,937.

*To all whom it may concern:*

Be it known that I, MALCOLM M. McLEAN, a citizen of the United States, residing at Salt Lake City, in the county of Salt Lake and State of Utah, have invented certain new and useful Improvements in Vehicle-Tires; and I do declare the following to be a full, clear, and exact description of the invention, such as will enable others skilled in the art to which it appertains to make and use the same.

My invention has for its object to provide an efficient means for forming an air-tight seal between the beads of pneumatic vehicle tires so as to permit the casings or shoes to contain air pressure without necessitating the use of the usual inner tube, thus eliminating the constant chafing which usually takes place between the tube and casing as the tire yields during its travel.

With the foregoing general object in view, the invention resides in certain novel features of construction and in unique combinations of parts to be hereinafter fully described and claimed, the descriptive matter being supplemented by the accompanying drawing which constitutes a part of this application and in which:

Figure 1 is a vertical transverse section of a vehicle tire equipped with the improved seal;

Fig. 2 is a sectional perspective view of a portion of the seal;

Fig. 3 is an enlarged vertical section of the inflation valve set for discharging into the inner tube or seal;

Fig. 4 is a similar view with the valve adjusted for inflating the casing;

Fig. 5 is a detail transverse section of the valve on the plane of the line 5—5 of Fig. 3.

In the drawing above briefly described, the numeral 1 designates a common type of tire casing now in every day use upon automobiles, motor cycles, and upon some makes of bicycles, said casing having inwardly converging sides 2 terminating in the usual spaced disconnected rim engaging beads 3. Usually employed within the casing 1 is an inner tube which contains the air pressure whereby the tire is held distended, but due to the nature of the present invention, this tube is eliminated and the casing 1 is sealed between the beads 3 so that said casing may be inflated.

The seal is in the form of a heavily constructed inner tube 4 substantially wedge-shaped in transverse section and of a size to fill only a restricted portion of the casing 1, it being intended that the inwardly converging sides 5 of said tube shall contact with the sides 2 of the tire and with the similarly positioned inner surfaces of the beads 3 as shown in Fig. 1. With the seal positioned in this manner, it is inflated and thus comes in air-tight contact with the casing so that the latter may likewise be inflated. For first inflating the tube 4 and then the unoccupied portion of the casing 1, any appropriate valve such as that designated by the numeral 6 may be provided. The valve shown is constructed as follows:

A tubular valve casing 7 passes through the inner and outer sides of the seal 4 and is provided with a head 8 whose ends contact with said sides, being held in such contact by a cap 9 and a nut 10, said cap being threaded over the inner end of the casing and having a discharge port 11. The inner wall of head 8 is formed with a longitudinally extending port 12 whose ends are adapted for registration with ports 13 and 14 formed longitudinally through a rotatable valve member or stem 15 which is mounted in the tubular casing 7.

The outer end of stem 15 is provided with a suitable check valve 16 from which the port 13 leads, said port discharging at 17 through one side of the stem for registration either with the port 12 or with a discharge port 18 with which the casing 7 is provided for delivering into the seal 4. The inner end of port 14 registers with port 11 whereas the outer end thereof opens through one side of the stem at 19 for registration with port 12.

It is intended that the stem 15 shall be positioned as shown in Fig. 3 when the tube or seal 4 is to be inflated and that said stem shall then be turned until the lateral ends 17 and 19 of the ports 13 and 14 respectively, register with port 12 (see Fig. 4). Air may then be forced into the casing to inflate the latter. The outer end of stem 15 is preferably squared at 20 to receive a suitable tool whereby it may be set in either position, and although this tool could well be constructed in any suitable manner, it is preferably in the form of a socket 21 carried by the outer end of a valve cap 22 which is threaded over the outer end of the casing and stem. This is probably the most convenient arrangement but it will be understood that I do not wish to limit my invention to such details.

For insuring proper registration of the ports when the stem 15 is turned, I provide a stop 23 on the inner end of said stem for coaction with an internal abutment 24 formed on the cap 9. This arrangement will effectively limit the movement of the stem but here again it is to be understood that this feature is shown for illustrative purposes only, and that any preferred stop means could be employed.

The seal above described is applicable to all types of vehicle tires now in use, and regardless of the style of casing to which it is applied, the use of the usual inner tube is unnecessary. The tire is therefore rendered less expensive and more efficient since the constant chafing of the inner tube and casing of the ordinary tire causes the former to slowly leak with the result that it must be often reinflated. The tube 4 will be, by preference, made of sufficient strength to uphold the weight of the vehicle in case of puncturing the casing 1 and permitting the air to escape therefrom. Said tube, however, is spaced such a distance from the tread of the casing as to render puncturing of said tube practically impossible.

On account of the advantages derived from the construction above pointed out, this construction constitutes the preferred form of the improved tire. It is to be understood, however, that within the scope of the invention as claimed, numerous changes may be made without sacrificing the principal advantages.

I claim:—

An inflation valve of the class described comprising a tubular casing adapted to pass through an inner tube with its inner end open for discharging air at the periphery of said tube, said casing having in its side a port for discharging into the tube and having opposite said port a longitudinal bypass, and a stem rotatably mounted in said casing and having an inlet port opening through one side thereof for registration either with said first named port or said bypass, said stem having an additional port opening through its inner end and having an inlet portion for registration with said by-pass.

In testimony whereof I have hereunto set my hand in the presence of two subscribing witnesses.

MALCOLM M. McLEAN.

Witnesses:
ROSE O'NEILL,
GRACE HILL.